United States Patent [19]

Sotolongo

[11] 4,240,688

[45] Dec. 23, 1980

[54] FLOOR FIXTURE

[75] Inventor: Thomas J. Sotolongo, Clearwater Beach, Fla.

[73] Assignee: AMP Incorporated, Harrisburg, Pa.

[21] Appl. No.: 80,911

[22] Filed: Oct. 1, 1979

[51] Int. Cl.³ .................................... H01R 13/506
[52] U.S. Cl. ............................... 339/122 F; 174/48; 220/3.94; 339/125 R
[58] Field of Search ............ 339/119 R, 121, 122 R, 339/122 F, 123, 125, 132 R, 154, 158; 174/48, 49; 220/3.3, 3.94

[56] References Cited

U.S. PATENT DOCUMENTS

| D. 203,823 | 2/1966 | Kelly | D26/1 |
|---|---|---|---|
| D. 240,236 | 6/1976 | Bunnell | D26/113 |
| 2,987,690 | 6/1961 | Marbais | 220/3.94 |
| 3,047,650 | 7/1962 | Reiland | 174/49 |
| 3,083,857 | 4/1963 | Clark | 220/3.94 |
| 3,084,962 | 4/1963 | Feuerbacher | 339/132 R |
| 3,395,243 | 7/1968 | Kelly | 220/3.3 |
| 3,622,684 | 11/1971 | Press | 174/48 |
| 3,705,377 | 12/1972 | Hansen et al. | 339/119 R |
| 3,756,447 | 9/1973 | Hadfield | 220/3.3 |

FOREIGN PATENT DOCUMENTS 459979  1/1937  United Kingdom ............ 174/48

Primary Examiner—John McQuade
Attorney, Agent, or Firm—Anthony S. Volpe

[57] ABSTRACT

A floor fixture adapted for use with flat undercarpet power distribution systems has a face plate with a snap-in retaining feature requiring no screws and a mounting arrangement which allows for rotation of the fixture after installation.

3 Claims, 10 Drawing Figures

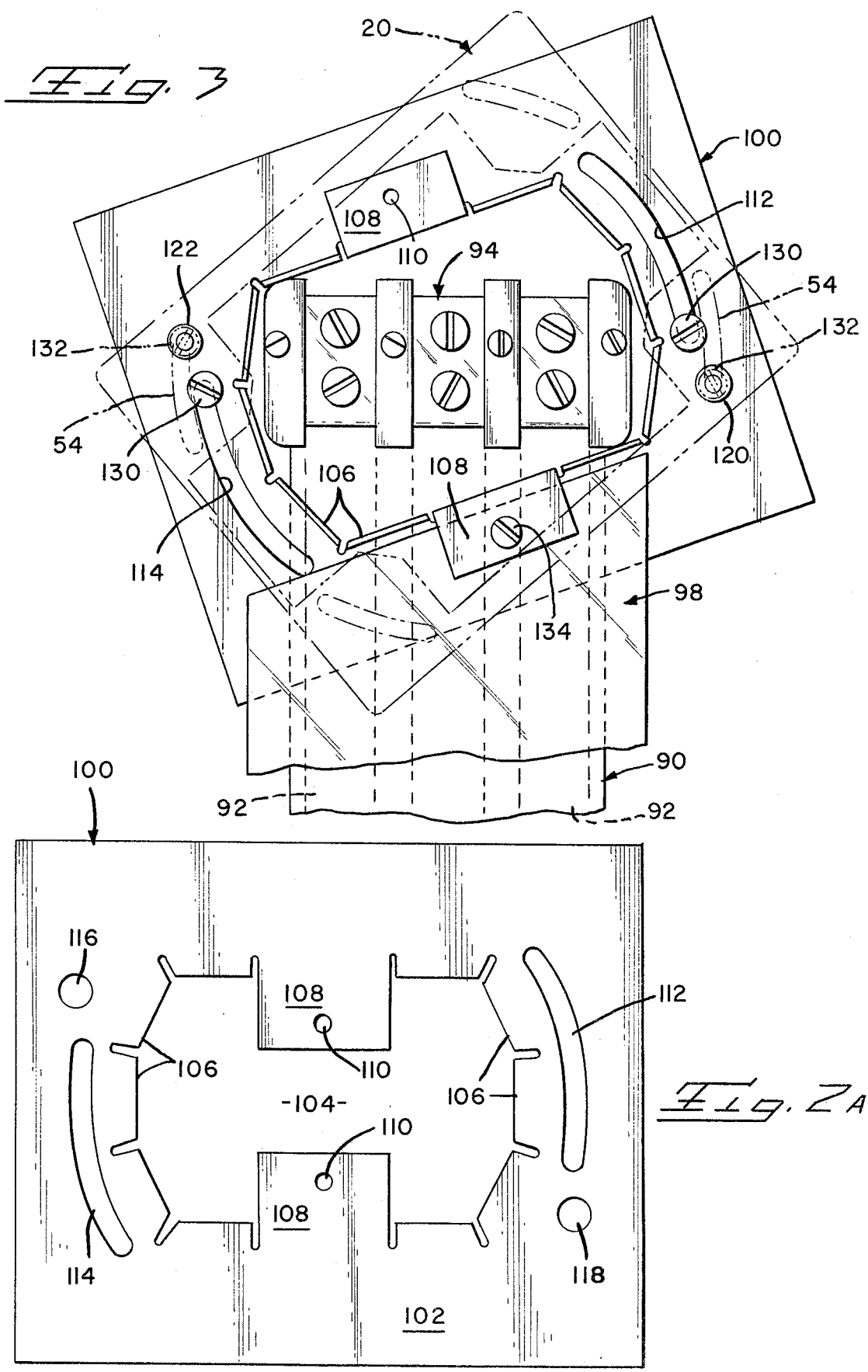

FLOOR FIXTURE

BACKGROUND OF THE INVENTION

1. The Field Of The Invention

The present invention relates generally to an electrical floor fixture of improved construction for use in a wire distribution system. More specifically, the floor fixture is intended to provide electrical service above the floor covering without regard to in-wall wiring or structural mounting limitation. The present device is particularly adapted for use with under carpet power distribution systems.

Under carpet power distribution systems differ from the normal underfloor conduit systems in that the former system uses flat ribbon cable, having a plurality of flat conductors embedded therein, which is placed directly on the flooring surface and beneath the floor covering. In this manner, electrical power may be routed without regard to the structural walls or conduit systems. The expanded use of under carpet power systems is a relatively recent innovation which is generally restricted to commercial buildings where frequent relocation of outlets or interior alterations render conduit systems impractical. Along with the frequent location changes, there is often a need to have position flexibility, that is, it is frequently necessary to rotate an outlet for practical as well as aesthetic reasons.

2. The Prior Art

There are a number of prior art floor fixtures which provide a rotation feature when coupled with underfloor conduit systems or mounted on floor plates related with the underfloor conduit systems which are embedded in concrete. However, to date there has been no offering of a rotatable floor fixture suitable for use with the under carpet power distribution systems.

SUMMARY OF THE INVENTION

The disclosed device provides a floor fixture having arcuate slot mounting which provides a rotatable fixture especially adapted for use with under carpet power systems. Additionally, the face plates of the fixture are secured by a novel mounting means which eliminates the need for screws in securing the face plate to the floor fixture.

It is an object of this invention to provide a floor fixture for use in under carpet power distribution systems.

It is an object of this invention to provide an improved rotatable floor fixture.

It is an object of this invention to provide a floor fixture having a face plate devoid of any separate means of securing said face plate to said fixture.

BRIEF DESCRIPTION OF THE DRAWINGS

FIG. 2A is a plan view of the floor plate.

FIG. 3 is a graphic representation of the steps in mounting the housing.

DESCRIPTION OF THE PREFERRED EMBODIMENT

Figure 1:
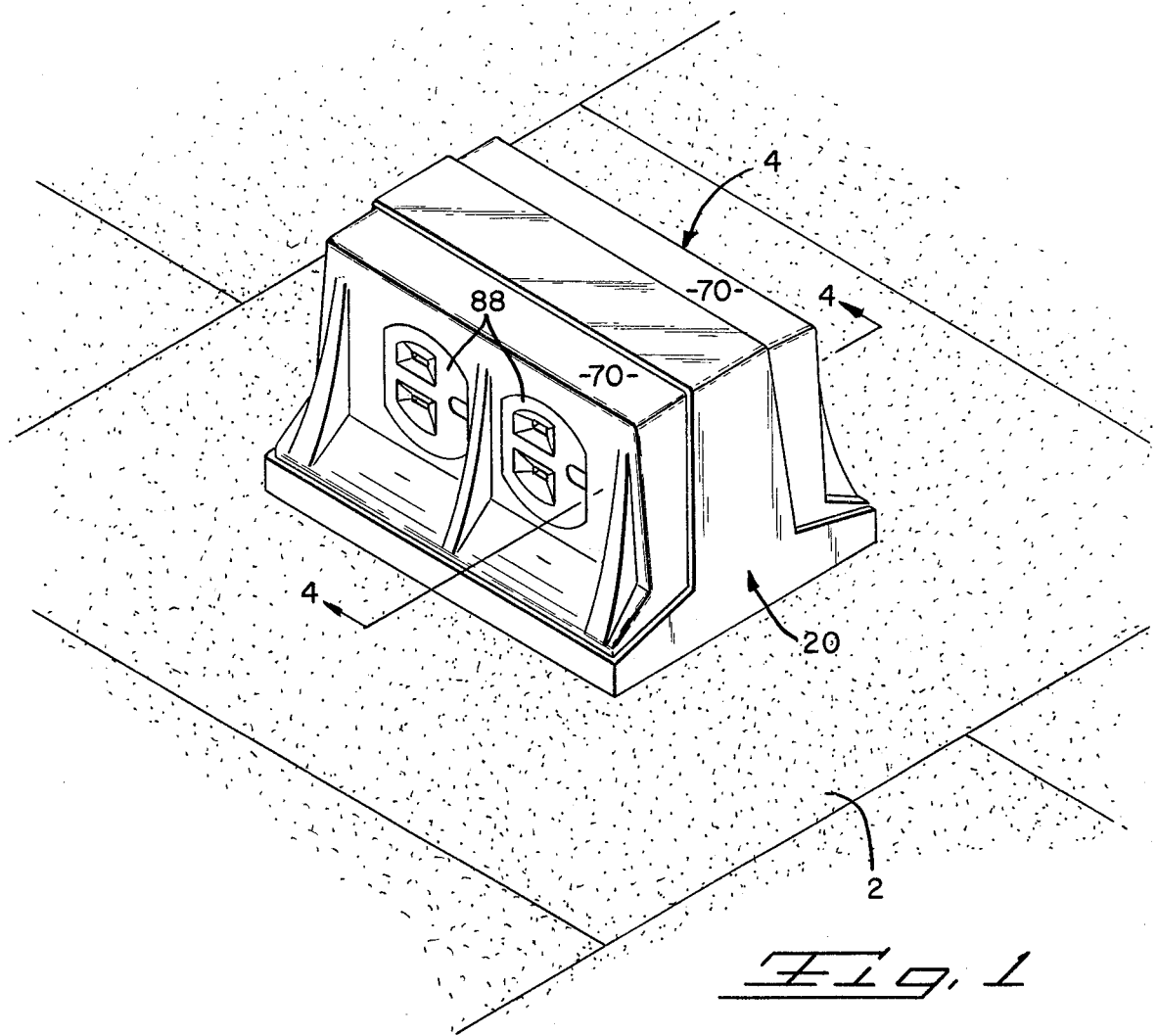
FIG. 1 is a perspective view of an assembled floor fixture.

With reference to the attached figures, a preferred embodiment will be described in detail. FIG. 1 shows a floor fixture 4 positioned on a carpet square 2 which has been cut and trimmed. Floor fixture 4 has exposed housing 20, standard duplex receptacle 88, and face plates 70.

Figure 2:
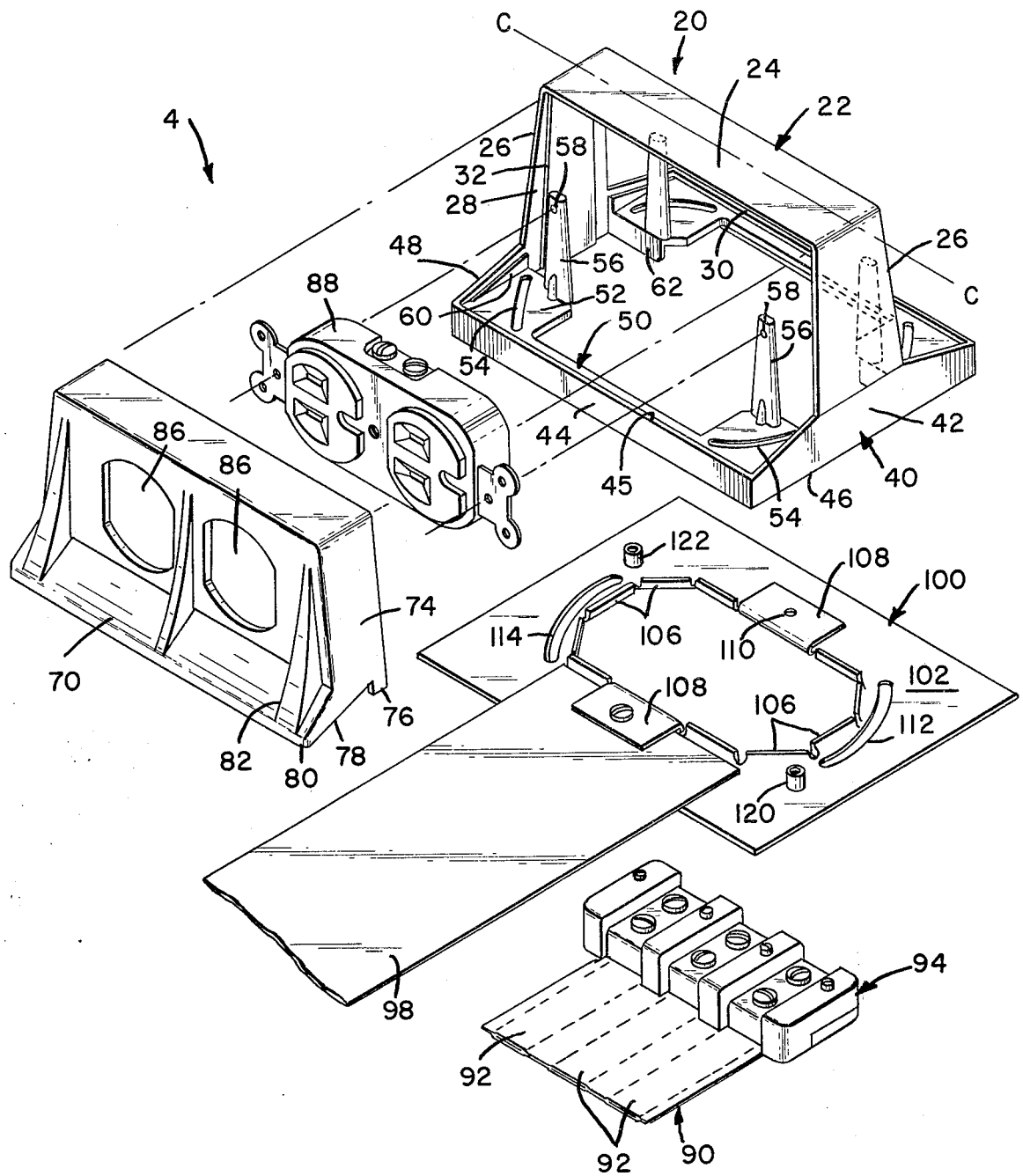
FIG. 2 is an exploded perspective view of the floor fixture and an under carpet wiring system.

Since housing 20 is symmetric about the centerline c—c, FIG. 2, the numerals accompanying the description will be limited to those necessary to call out the features on one side of the fixture.

Housing 20 is die cast as a one piece unit having generally an upper frame 22 and a base 40. Frame 22 is comprised of a rectangular bight 24 flanked by vertically disposed sidewalls 26 which cant outward from the perpendicular to bight 24 and join base 40 at sides 42. Edges 28 cant at approximately five degrees (5°) from a plane normal to the sidewalls 26 and the bight 24. Ridge 32 extends squarely around the inner surface of frame 22 and sides 42 and is recessed from edge 30 of bight 24 by approximately 0.120.

Faces 44 of base 40 are rectangular in shape and extend between sides 42. Sides 42 have lower edges 46 which are perpendicular to face 44 and upper edges 48 which extend from face 44 to edges 28 at a fifteen degree (15°) angle to edges 46.

Floor 50 is generally "C"-shaped and positioned approximately 0.050 below the top edge 45 of face 44. At either end of floor 50 is a platform 52 which has an arcuate slot 54 which is positioned diagonally between face 44 and side 42. A post 56 extends upwardly from each platform 52 on the concave side of slot 54 opposite face 44 and side 42. Post 56 is tapped at 58 to accept a standard screw for mounting a standard duplex receptacle thereon. Mounts 60 are right triangular in shape and are located on the inner surfaces of sides 42. Mount 60 has its altitude at an inner edge of platform 52 and its hypotenuse approximately 0.095 below edge 48 of side 42. Skirt 62 extends parallel to face 44 and provides support for platform 52.

Face plate 70 is molded of acrylonitrile-butadiene-styrene in the preferred embodiment, however, any suitable material providing sufficient flexibility side members 74 may be used. Side member 74 is constructed to complement the structure of housing 20 and achieve a locking therewith. The overall height of side member 74 from top to heel 76 is received within housing 20. Heel 76 is dimensioned to be received between ridge 32 and mount 60 of housing 20.

Figures 5, 6:
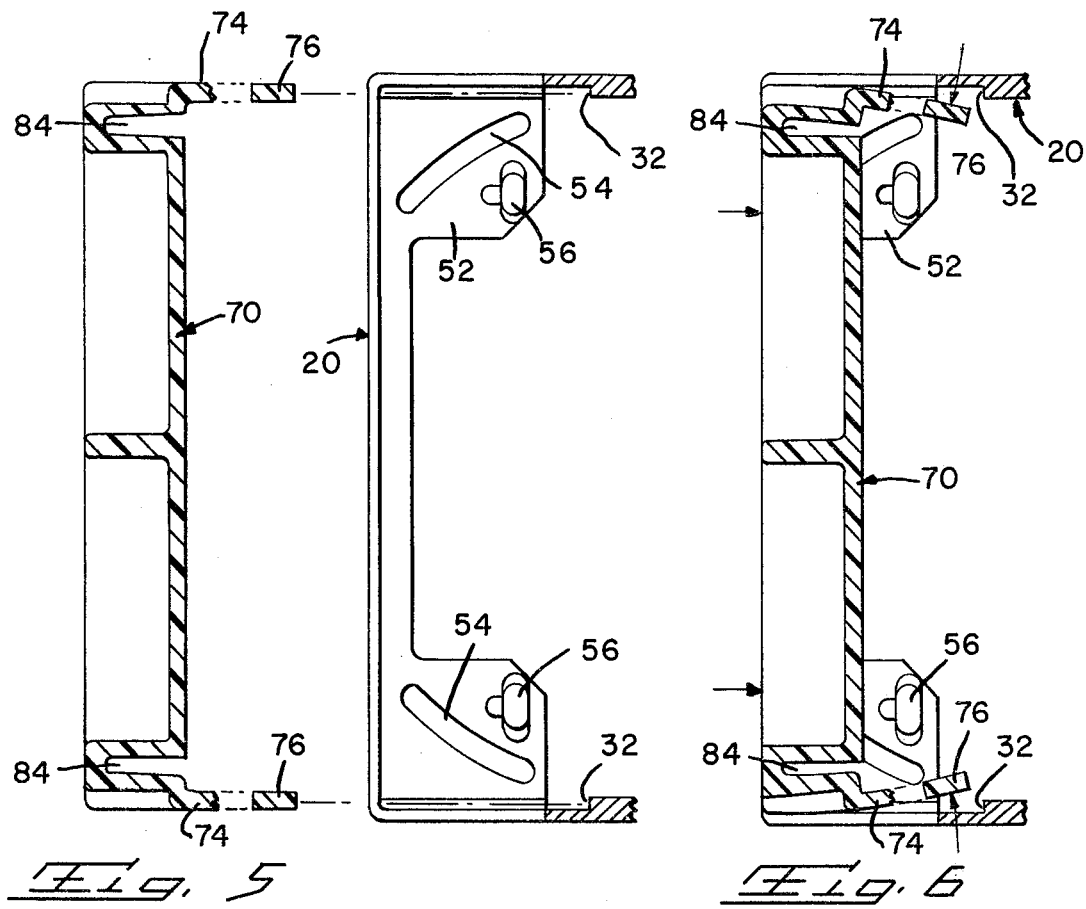
FIGS. 5-9 depict the assembly of the face plate to housing for a floor fixture.
Figures 7, 8:
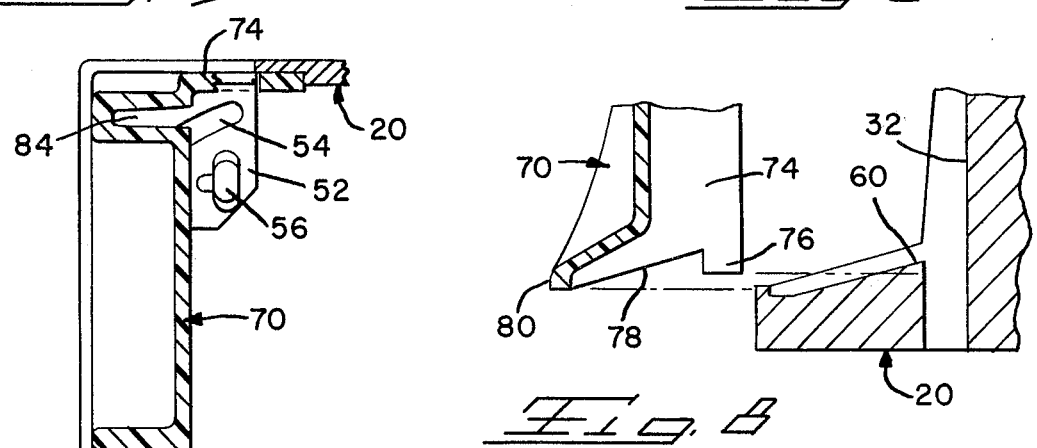
Figure 9:
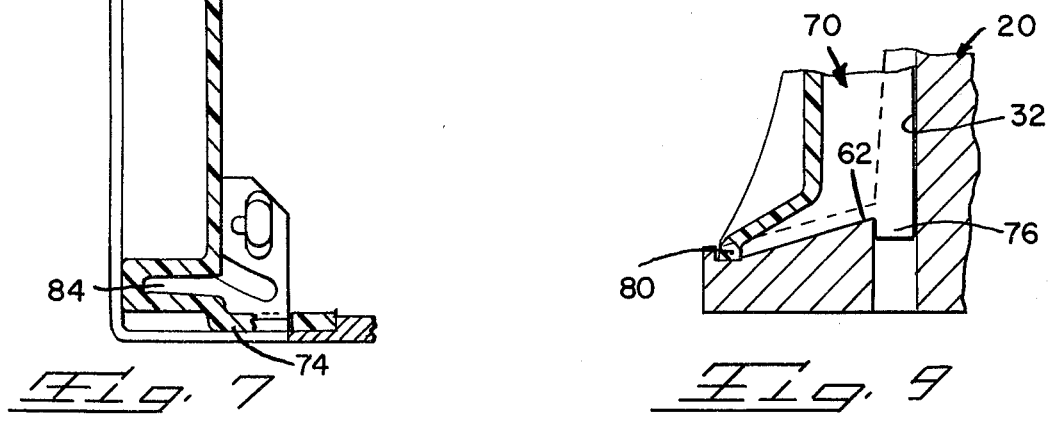

Sole 78 is dimensioned to complement mount 60 and toe 80 is dimensioned to rest on platform 52 adjacent face 44. The combination of face plate 70 and housing 20 will be more fully explained in the assembly details hereinafter. Rib 82 has a void 84, shown in FIG. 5, which has been found to be beneficial in flexing during assembly, however, the rib 82 is not essential to the operation of the invention. The openings 86 are dimensioned to accept a standard duplex receptacle 88.

Turning now to FIG. 2, there is shown the preferred embodiment of the present invention with the associated hardware for use in a flat conductor system. The system comprises a ribbon cable 90 with three flat conductors 92 embedded therein, a terminal block 94 for transition from flat conductors to round conductors, a flat stock ground shield 98 and a floorplate 100. Terminal block 94 is described in U.S. Pat. application Ser.

No. 43,769, filed May 30, 1979. Flat conductor ribbon cable 90 and ground shield 98 are known in the art.

Floor plate 100 is stamped and formed sheet metal having a thickness of 0.063, see FIG. 2A.

Opening 104 is generally centered in base 102 of floor plate 100. The use of a modified elliptical opening provides additional clearance at either end of terminal block 94; its purpose will be explained hereinafter. A series of upstanding members 106, integral with base 102 and generally perpendicular thereto, surrounding opening 104 are provided as strengthening members. Opposed tabs 108 are integral with base 102 and are bent back parallel to base 102 in a U-shaped fashion. Hole 110 is punched in tab 108 to accept a self-tapping standard sheet metal screw. Arcuate slots 112 and 114 are positioned adjacent the elliptical ends of opening 104 and extend across the centerline of plate 100 from points on the diagonal of plate 100. Posts 120 and 122 (FIG. 2) having threaded bores therein are affixed to plate 100 on the other diagonal at either end of opening 104 in prepunched holes 116 and 118.

Assembly

Figure 4:
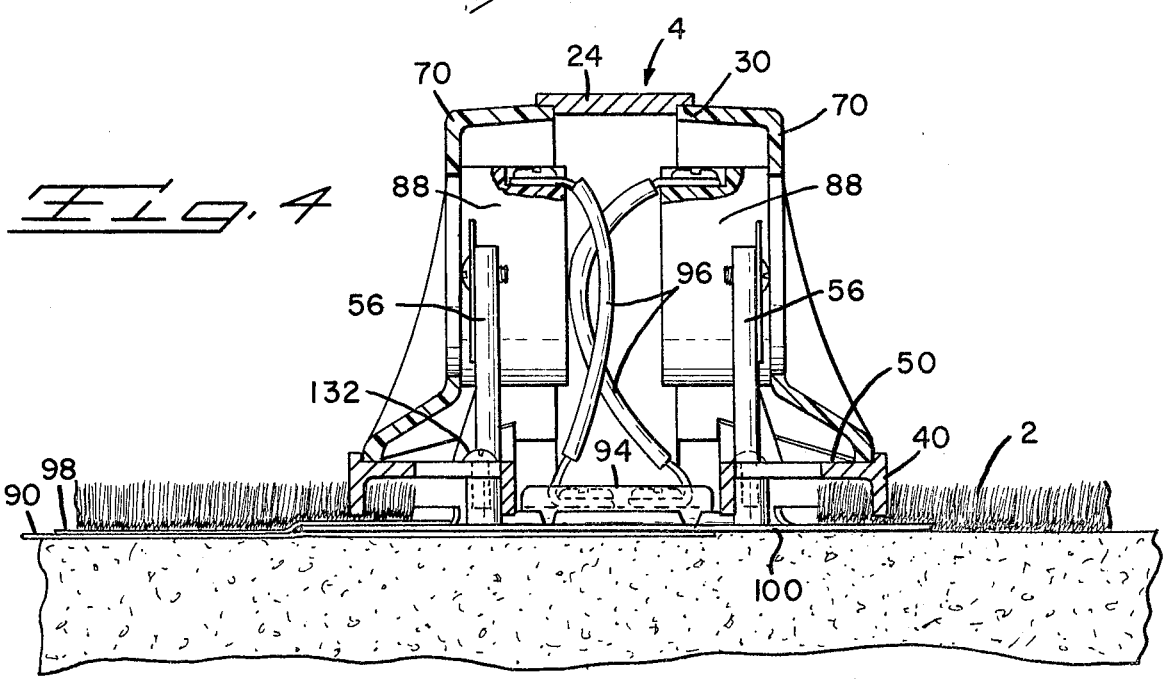
FIG. 4 is a section through the lines 4—4 of FIG. 1.

Referring now to FIG. 3, ribbon cable 90 with terminal block 94 attached is positioned on the flooring and floor plate 100 is located over the terminal block 94 in the desired orientation. Floor plate 100 is secured to the flooring via suitable fasteners 130 through arcuate slots 112 and 114. Ground shield 98 is fitted to floor plate 100 and electrically interconnected to tab 108 via a machine screw 134 in hole 110. Referring now to FIG. 4, suitable lengths of round conductors 96 are secured to terminal block 94. Housing 20 is then positioned over floor plate 100 with selected diagonally opposed arcuate slots 54 over the posts 120 and 122. Suitable fasteners 132 are placed through arcuate slots 54 and threaded into the bores in posts 120 and 122 respectively to secure housing 20 to floor plate 100. A standard duplex receptacle 88 is connected in the usual fashion to round conductor 96 and mounted on posts 56. Adjustment or rotation of the assembly may be accomplished by loosening fasteners 130 and 132 and rotating the respective arcuate slots. If additional adjustment is desired, fasteners 132 may be removed and housing 20 rotated to locate the second set of diagonally opposed platforms 52 over the respective threaded posts 120 and 122.

Face plates 70 are mounted on housing 20 by squeezing side members 74 inward, locating toe 80 behind face 44 and moving top 72 of face plate 70 against ridge 32 and under bight 24 of housing 20. Side members 74 are then released which will cause heel 76 and sole 78 to locate on and behind mount 60. The mounting sequence is shown sectionally in FIGS. 5 through 9.

What is claimed is:

1. A floor fixture comprised of:

a housing comprised of a base having two opposed sides and two opposed faces which define an aperture therebetween and having mounting means located on said sides, opposed upright side walls spaced from said faces and extending from said sides to a bight extending between said sidewalls, said bight and sidewalls having a raised ridge extending around the interior thereof, a face plate having flexible side members, said side members having a height at least equal to the distance from said bight to said mounting means of said housing, said side members having a bottom surface configured to complement said mounting means and a depth no greater than the distance from a face to said ridge of said housing whereby, said side members are flexed inward, said face plate is moved into said housing until it is against said ridge and said side members are released locking said complementary bottom surfaces against said mounting means.

2. A floor fixture comprised of:

a housing comprised of a base having two opposed sides and two opposed faces which define an aperture therebetween, a pair of platforms, said platforms located at diagonally opposed unions of sides and faces, each of said platforms having an upstanding post thereon and a slot therein, said slot being located between said upstanding post and said union, and a pair of mounting means located on said sides adjacent to said platforms, opposed upright side walls spaced from said faces and extending from said sides to a bight extending between said sidewalls, said bight and sidewalls having a raised ridge extending around the interior thereof;

a face plate having flexible side members, said side members having a height at least equal to the distance from said bight to said mounting means of said housing, said side members having a bottom surface configured to complement said mounting means and a depth no greater than the distance from a face to said ridge of said housing whereby, said side members are flexed inward, said face plate is moved into said housing until it is against said ridge and said side members are released locking said complementary bottom surfaces against said mounting means.

3. A rotatable floor fixture for use in a current distribution system comprised of:

a floor plate adapted to be secured to a floor, said floor plate having an aperture with at least two mounting posts positioned diagonally across said aperture and two arcutate slots positioned diagonally on a second diagonal across said aperture and proximate to said mounting posts, first securing means for securing said floor plate to said floor through said arcuate slots, a housing for mounting on said floor plate, said housing having two opposed sides and two opposed faces defining a second aperture in a plane above and parallel to the plane of said floor plate, a pair of platforms positioned at diagonally opposed unions of sides and faces, each platform having an arcuate slot located for mating with one of said mounting posts, second securing means for securing said housing to said posts on said floor plate, whereby, rotation is achieved by loosening said first and second securing means and rotating said floor plate arcuate slots and rotating said arcuate slots of said housing on the mounting posts of said floor plate.

* * * * *